United States Patent [19]
Hochman

[11] 3,893,196
[45] July 8, 1975

[54] BODY IMPLANT MATERIAL

[76] Inventor: Robert F. Hochman, 3136 River Heights Dr., Smyrna, Ga. 30080

[22] Filed: Oct. 11, 1972

[21] Appl. No.: 296,708

Related U.S. Application Data

[63] Continuation of Ser. No. 61,606, Aug. 6, 1970, abandoned.

[52] U.S. Cl. ............... 3/1.91; 3/1.913; 128/92 BA; 128/92 BC; 128/92 CA
[51] Int. Cl. ............................................. A61f 1/20
[58] Field of Search ........ 3/1.91, 1.913; 128/92 BA, 128/92 BC, 92 CA

[56] References Cited
UNITED STATES PATENTS

| | | | |
|---|---|---|---|
| 3,314,420 | 4/1967 | Smith et al. | 128/92 |
| 3,526,906 | 9/1970 | Laszlo | 3/1 |

OTHER PUBLICATIONS

"Inst. of Mech. Engineers Proceedings," Vol. 181, pt. 3J., pages 30–35 cited.

"Medical Electronics and Biological Engineering," Vol. 3, 1965, pages 128–36 cited.

"Reinforced Plastics and Composite World," Vol. 7, No. 1–No. 3, (pages 9–13 cited, May/June, 1968).

*Primary Examiner*—Robert W. Michell
*Assistant Examiner*—V. Millin
*Attorney, Agent, or Firm*—Olson, Trexler, Wolters, Bushnell & Fosse, Ltd.

[57] ABSTRACT

A material for use in fabricating a prosthesis or other body implant comprises graphite or boron fibers embedded in or coated with a medically inert plastic. The plastic binder may be a medical grade silicone polymer or the plastic may, for example, be an epoxy resin and with the epoxy resin being coated with a medically inert silicone polymer. The resultant composite has substantially better mechanical and clinical properties than conventional materials.

2 Claims, 5 Drawing Figures

PATENTED JUL 8 1975  3,893,196

Inventor
Robert F. Hochman
By Olson, Trexler, Wolters & Bushnell
attys.

BODY IMPLANT MATERIAL

This is a continuation of application Ser. No. 61,606 filed Aug. 6, 1970, now abandoned.

This invention relates to improvements in materials for use in medical implantation.

An object of this invention is to provide a medical implant material which is non-toxic, chemically inert to human tissue, and yet possesses a high tensile and fatigue strength and dimensional stability while at the same time having a relatively high strength-to-weight ratio.

It is a further object of this invention to provide a material of the type stated which can be readily fabricated into various shapes for use as a tube, suture, orthopedic implant or dental implant, or the like.

A still further object of this invention is to provide a material of the type stated which can be fabricated to produce a prosthesis or other implant device having predetermined strength, porosity and stiffness characteristics in different directions, thus permitting the device to be custom designed for maximum compatibility with the human body at the region of implant.

In a preferred embodiment, the present invention comprises an implant material that is formed of graphite fibers coated with a plastic material, such as medically inert silicone. Graphite is medically inert to the human body. The silicone is a commercially available medical grade of an organopolysiloxane. The graphite fibers (e.g., filaments or whiskers) are also a product known in the art and are available in varying modulii of elasticity. The fibers are, broadly speaking, graphitized by heating woven or non-woven textiles (e.g., nylon, regenerated cellulose) under controlled temperature and atmospheric conditions. The graphite fibers are coated in the elastomer to form a substantially homogeneous material. The coating may fully embed the fibers in the plastic. By varying the proportions of the graphite fibers and the elastomer, or by varying the modulus of the fibers, the modulus and flexibility of the implant may be adjusted. Also, the orientations of the fibers may be selected to provide directional strength and flexibility characteristics. Silicone elastomers and other silicones have been widely used for prostheses and other implants by the medical profession chiefly due to the fact that such materials are inert to human tissue. Silicone elastomers are, however, low in tensile strength, which makes them unsuitable, in and of themselves, for some implants.

In other forms of the invention, the implant may comprise boron fibers coated with a silicone polymer, or boron or graphite fibers coated with an epoxy resin. However, since the chemical inertness of epoxy resins to body tissue is not complete, an implant utilizing a fiber/epoxy composite should be completely coated with a suitable medical grade of silicone. Boron fibers, like graphite fibers, are known and are commercially available. Broadly speaking, they may be prepared by the decomposition of boron onto small diameter substrates, such as tungsten wire. Boron fibers have excellent strength in tension, compression and fatigue. However, they are reactive in the human body. Nevertheless, implants utilizing boron fibers may be suitable in some instances. By insuring that the boron fibers are fully encapsulated by a medically inert silicone polymer, an implant using boron fibers may be rendered inert to the human body.

The attainment of the above and further objects of this invention will be appparent from the following description taken in conjunction with the accompanying drawing forming a part thereof. In the drawing.

Figure 1:
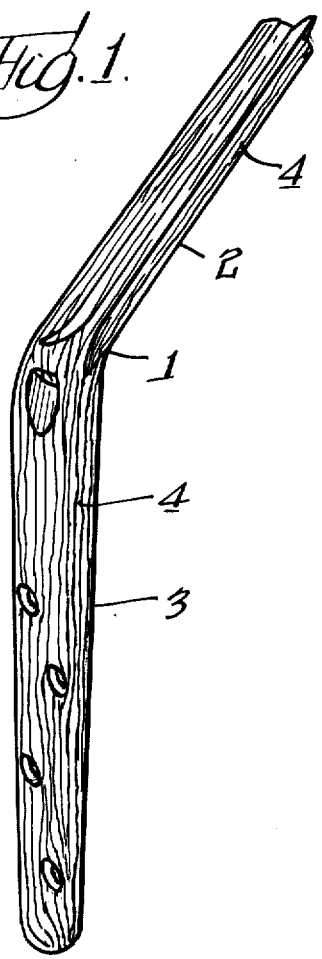
FIG. 1 is a perspective view of a typical implant constructed in accordance with and embodying the present invention.

Referring now in more detail to the drawing, FIG. 1 illustrates one type of implant 1, which is a nail and plate used to restore the correct angle between the femoral neck and the femoral shaft. The external configuration of the implant 1 is known and comprises generally a nail portion 2 for insertion into the femoral neck and a plate portion 3 for attachment to the exterior of the femoral shaft. The implant 1 is formed of graphite fibers 4 embedded in a silicone rubber and with the fibers 4 running longitudinally of the plate portion 3 and nail portion 2. The silicone may be a medical grade silicone of a known type, for instance medical grade No. 382 silicone rubber that is produced by Dow-Corning Corporation, Midland, Michigan.

The implant 1 may be made in accordance with conventional molding techniques. For example, the graphite fibers may be placed in the mold, after which the silicone is introduced into the mold, following which the mass is heated to polymerize the silicone rubber at a suitable temperature and under a suitable pressure. After removal from the mold, the product may, if desired, be machined or otherwise reshaped.

The implant 1 has an exceedingly high strength in tension, compression and fatigue. The latter is of special significance since a principal cause of fracture of orthopedic implants made from various metal alloys is fatigue. The material of the present invention has a substantially higher fatigue strength than body implant alloys presently used.

Furthermore, graphite fibers are available in a wide range of modulii of elasticity, and may be in the form of woven or non-woven textiles. Therefore, the particular graphite fiber selected may be chosen to accommodate both the strength and flexibility requirements of the implant at the region of the body where it is to be used.

Figure 2:
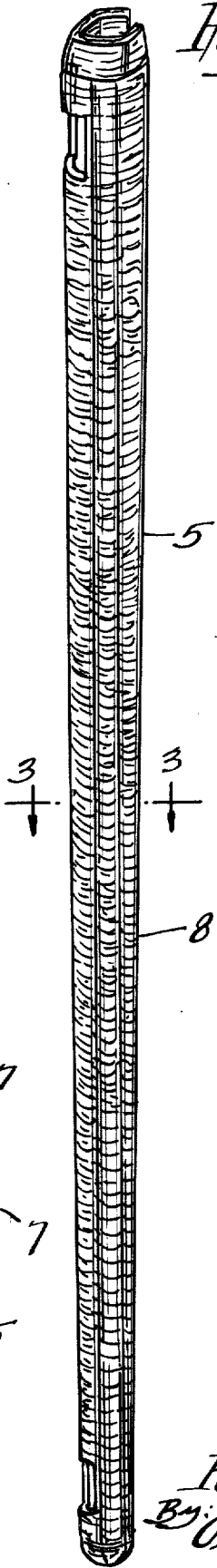
FIG. 2 is a perspective view of another body implant constructed in accordance with a modified form of the invention.
Figure 3:
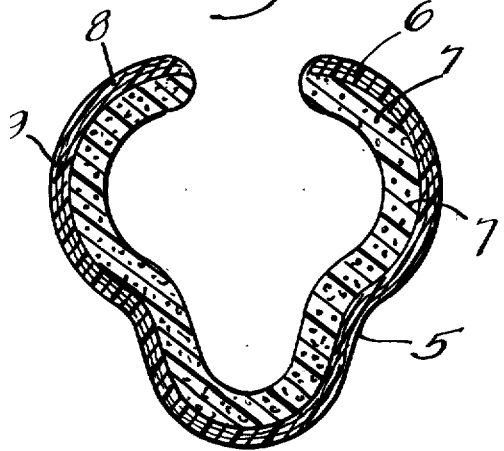
FIG. 3 is a sectional view taken along line 3—3 of FIG. 2.

FIG. 2 shows another implant 5 in the form of an intramedullary nail for use in the femoral medullary canal. The implant 5 has the cloverleaf cross-section shown in FIG. 3 and is formed of the graphite fiber-silicone polymer previously described. The implant 5, however, is formed of a composite of layers wherein the inner layer 6 has the graphite fibers 7 running longitudinally of the implant 5 and an overlay 8 in which the graphite fibers 9 run circumferentially of the implant 5, that is, at right angles to the fibers in the inner layer 6. By this arrangement both longitudinal and circumferential strength are imparted to the implant 5.

Figure 4:
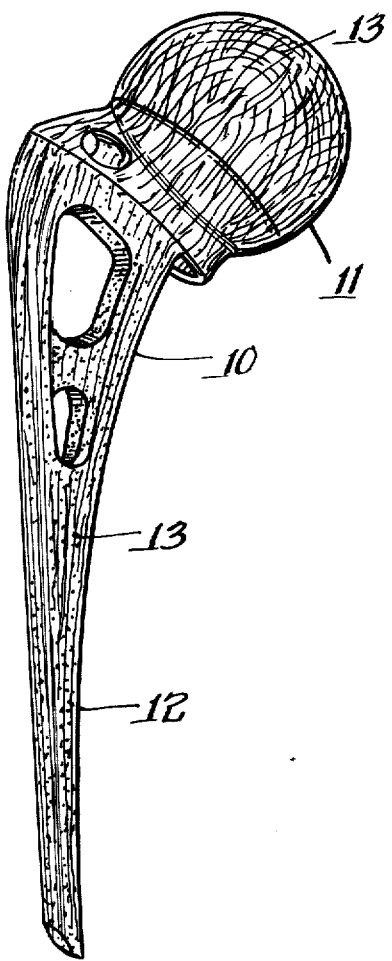
FIG. 4 is a perspective view of a prosthesis embodying the present invention.

FIG. 4 shows a body implant in the form of a femoral hip prosthesis 10. The prosthesis 10 has a head 11 for replacement of the femoral neck and a lower part or stem 12 which is secured in the femoral medullary canal.

In the prosthesis 10 the head 11 has graphite fibers 13 of random orientation so as to provide strength in all directions. The graphite fibers 13 in the stem extend longitudinally of the stem 12. The silicone plastic of the head 11 is non-porous while the plastic of the stem 12, or at least the surface thereof, may be porous to enable bone to knit to the prosthesis 10. Porosity may be imparted to the stem 12 in the molding thereof in a known manner.

Figure 5:
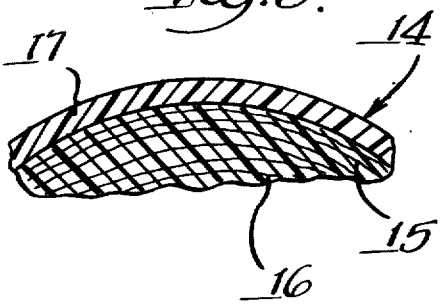
FIG. 5 is a fragmentary, sectional view of an enlarged scale of a modified form of implant or prosthesis embodying the present invention.

FIG. 5 shows a portion of a modified form of implant 14 having graphite fibers 15 embedded in an epoxy resin 16. Such resins are known in the art, and when combined with the graphite fibers 15 provide an implant of exceptionally high strength. However, to insure that the epoxy is completely isolated from the human body, the implant 14 is completely encapsulated by a layer of silicone rubber 17. The layer 17 may or may not include the graphite fibers, as desired.

Although certain specific examples of the present invention have been set forth herein by way of illustration, it will be understood that various changes are contemplated, and that all which fall within the purview of the following claims are to be construed as part of my invention.

The invention is claimed as follows:

1. A body implant including a structure with a longitudinally layered stem portion shaped for internal body placement and comprising a composite of fibers embedded and coated with plastic, the fibers being of the group consisting of graphite fibers and boron fibers, at least the outer surface of the structure being of plastic material substantially inert to substances in the human body, and with the fibers of an inner layer of the stem portion oriented in the longitudinal direction thereof and with the fibers of an outer layer of the stem portion oriented in a circumferential direction generally at right angles to the fiber orientation in the inner layer.

2. An orthopedic implant comprising a shaped composite with a longitudinally layered stem portion and including an organopolysiloxane presenting an outer surface that is inert to substances in the human body, and fibers included in the composite for reinforcement and within the outer surface and of the group consisting of graphite fibers and boron fibers, and with the fibers of one layer of the stem portion oriented longitudinally thereof and with the fibers of an adjacent layer oriented in a generally circumferential direction.

* * * * *